United States Patent
Goetz

(10) Patent No.: US 7,252,127 B2
(45) Date of Patent: Aug. 7, 2007

(54) REFLECTING BICYCLE TIRES

(76) Inventor: Mark Goetz, 1255 Catalpa Cir., Broomfield, CO (US) 80020

( * ) Notice: Subject to any disclaimer, the term of this patent is extended or adjusted under 35 U.S.C. 154(b) by 241 days.

(21) Appl. No.: 11/075,304

(22) Filed: Mar. 8, 2005

(65) Prior Publication Data

US 2006/0065340 A1   Mar. 30, 2006

Related U.S. Application Data

(60) Provisional application No. 60/613,313, filed on Sep. 27, 2004.

(51) Int. Cl.
*B60C 11/00* (2006.01)
*B29D 30/00* (2006.01)

(52) U.S. Cl. .............. 152/196; 152/203; 152/209.17; 156/110.1; 156/114; 156/123

(58) Field of Classification Search ............ 152/153, 152/192–196, 209.17, 203–207, 326, 500; 156/114, 116, 123
See application file for complete search history.

(56) References Cited

U.S. PATENT DOCUMENTS 1,322,321 A * 11/1919 McEwen ............... 152/153
2,242,430 A * 5/1941 Kraft ..................... 156/75
2,351,335 A * 6/1944 Holmes ................. 362/125
3,443,618 A * 5/1969 Kelley ................... 152/206
3,770,040 A * 11/1973 De Cicco ............... 152/152.1
3,946,782 A * 3/1976 Petrasek et al. ......... 152/209.5

OTHER PUBLICATIONS

Table 4 from article entitled "Asbestos" in Kirk-Othmer Encyclopedia of Chemical Technology, 2002.*

* cited by examiner

*Primary Examiner*—Geoffrey L. Knable
(74) *Attorney, Agent, or Firm*—Macheledt Bales & Heidmiller, LLP; Jennifer L. Bales

(57) ABSTRACT

Bicycle wheels have integral reflective areas to increase visibility of the bicycle. These areas show through portions of the wheel tread, so that the tread protects the reflector material from wear. The reflecting areas are scattered over the wheel and situated at a variety of angles with respect to the plane of the wheel so that reflectors are always situated to reflect light from the sun, a street lamp, or car headlights. A bicycle tire of the conventional sort having a tube and removable outer tire having tread is used. The outer tire has holes formed in it interspersed among the raised areas of tread. Reflecting material in sheets is placed between the outer wheel and the tube. Preferably, the reflecting material is affixed to the outer tire, and is coated with a protective coating.

14 Claims, 2 Drawing Sheets

REFLECTING BICYCLE TIRES

BACKGROUND OF THE INVENTION

This application claims the benefit of U.S. Provisional Patent Application No. 60/613,313, filed Sep. 27, 2004.

FIELD OF THE INVENTION

The present invention is related to tires with integral reflecting areas. More specifically, the present invention is related to bicycle tires having reflecting areas showing through areas of the tire tread.

DESCRIPTION OF THE RELATED ART

Bicycling on roads is dangerous because drivers in cars tend not to notice bicycles. The problems is even worse at night. Many methods have been used to make bicycles more visible. For example, many bicycles are fitted with head and tail lamps. Most have reflectors, and the bicycle riders frequently wear helmets or clothing with reflective areas.

However, the lights on bicycles are only visible from the front or back. Also, reflectors must be positioned correctly to catch and reflect light. This is a safety issue for everyone, and especially children, teenagers, and college students. Making bicycles highly visible is a life-saving improvement.

A need remains in the art for bicycle tires having integral reflective areas to make the bicycle highly visible to car drivers whenever the bicycle is moving.

SUMMARY OF THE INVENTION

An object of the present invention is to provide bicycle wheels having integral reflective areas. These areas show through portions of the wheel tread, so that the tread protects the reflector material from wear. The reflecting areas are scattered over the wheel and situated at a variety of angles with respect to the plane of the wheel so that reflectors are always situated to reflect light from the sun, a street lamp, or car headlights.

A bicycle tire of the conventional sort having a tube and removable outer tire having tread is used. The outer tire has holes formed in it interspersed among the raised areas of tread. Reflecting material in flexible sheets is placed between the outer wheel and the tube. Preferably, the reflecting material is affixed to the outer tire, and is coated with rubber or the like to protect it and the tube.

The reflecting material may be laminated reflective tape, glued into the inside of the outer tire. Preferably, the reflecting material is more than one color, for increased visibility. The protective rubber may be spray on rubber. Preferably, the holes in the outer tire are formed entirely or partially by melting, e.g. using a soldering iron or a hot drill. This seals the hole edges, preventing tearing. Alternatively, the holes may be molded in the tire during manufacture.

DETAILED DESCRIPTION OF THE PREFERRED EMBODIMENTS

Figure 1:
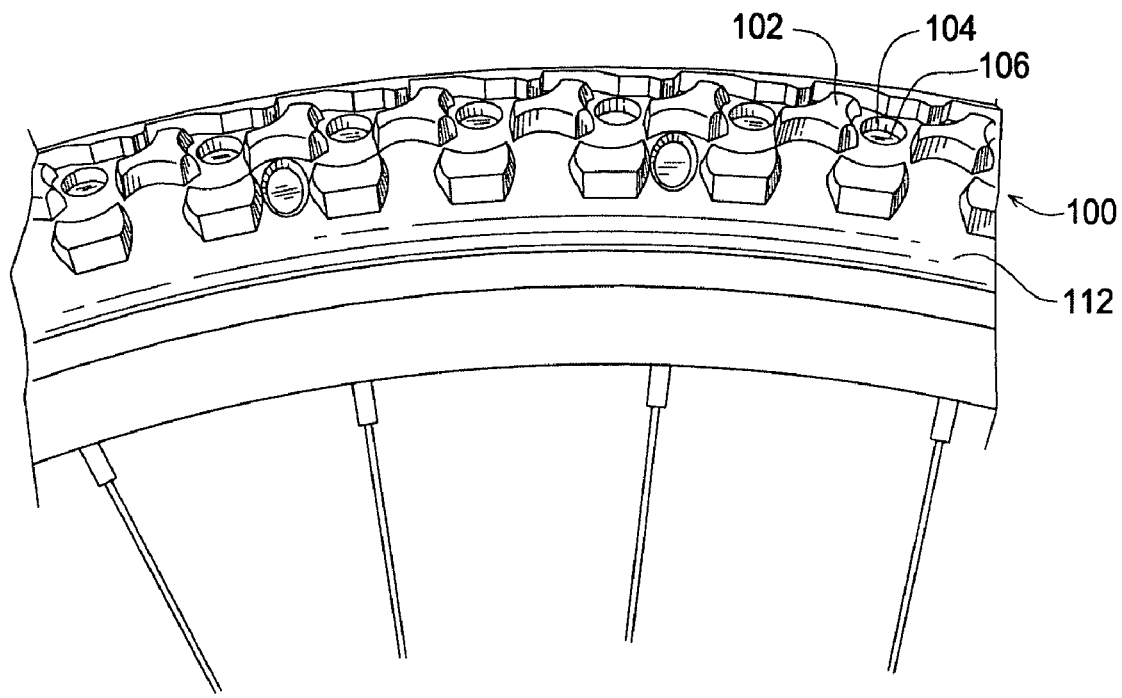
FIG. 1 is a side isometric view showing a portion of a bicycle wheel having a reflective tire according to the present invention.

FIG. 1 is a side isometric view showing a portion of a bicycle wheel having a reflective tire 100 according to the present invention. Reflective tire 100 includes a tube 110 (see FIG. 3) covered by an outer tire 112 having raised tread 102. Outer tire 112 has holes 104 formed in its surface, allowing reflector material 106 to show through.

Figure 2:
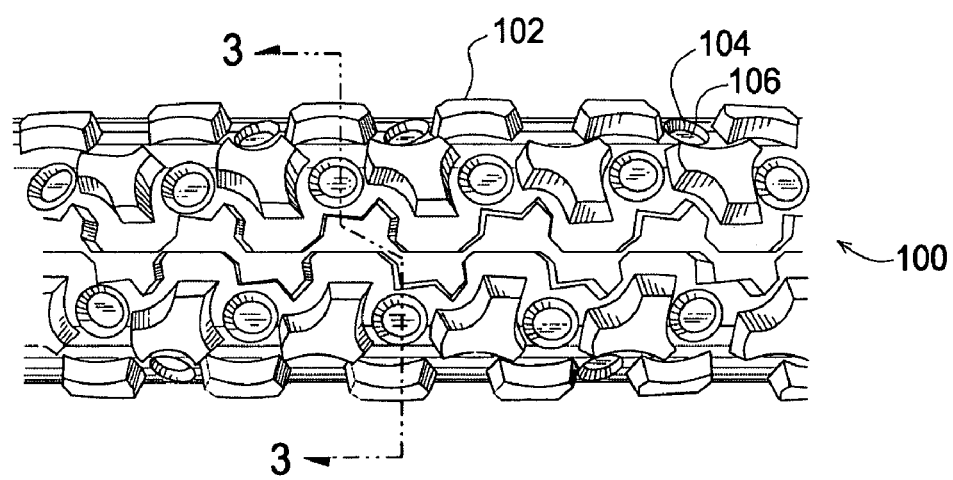
FIG. 2 is a top view of the tire of FIG. 1.

FIG. 2 is a top view of tire 100 of FIG. 1. It shows more detail of raised tread 102 and holes 104 with reflector material 106 showing through. It also indicates view 3-3, shown in FIG. 3. Note that holes 104 are scattered across outer tire 112, so that they face not just straight out from the center of the tire, but also at various angles from straight out. This results in light being reflected from tire 100 from light sources at a variety of angles. When the tire is rotating, the reflectors flash dramatically (viewed from the front, the back, or the side) in sunlight, street lamps, or headlights.

Figure 3:
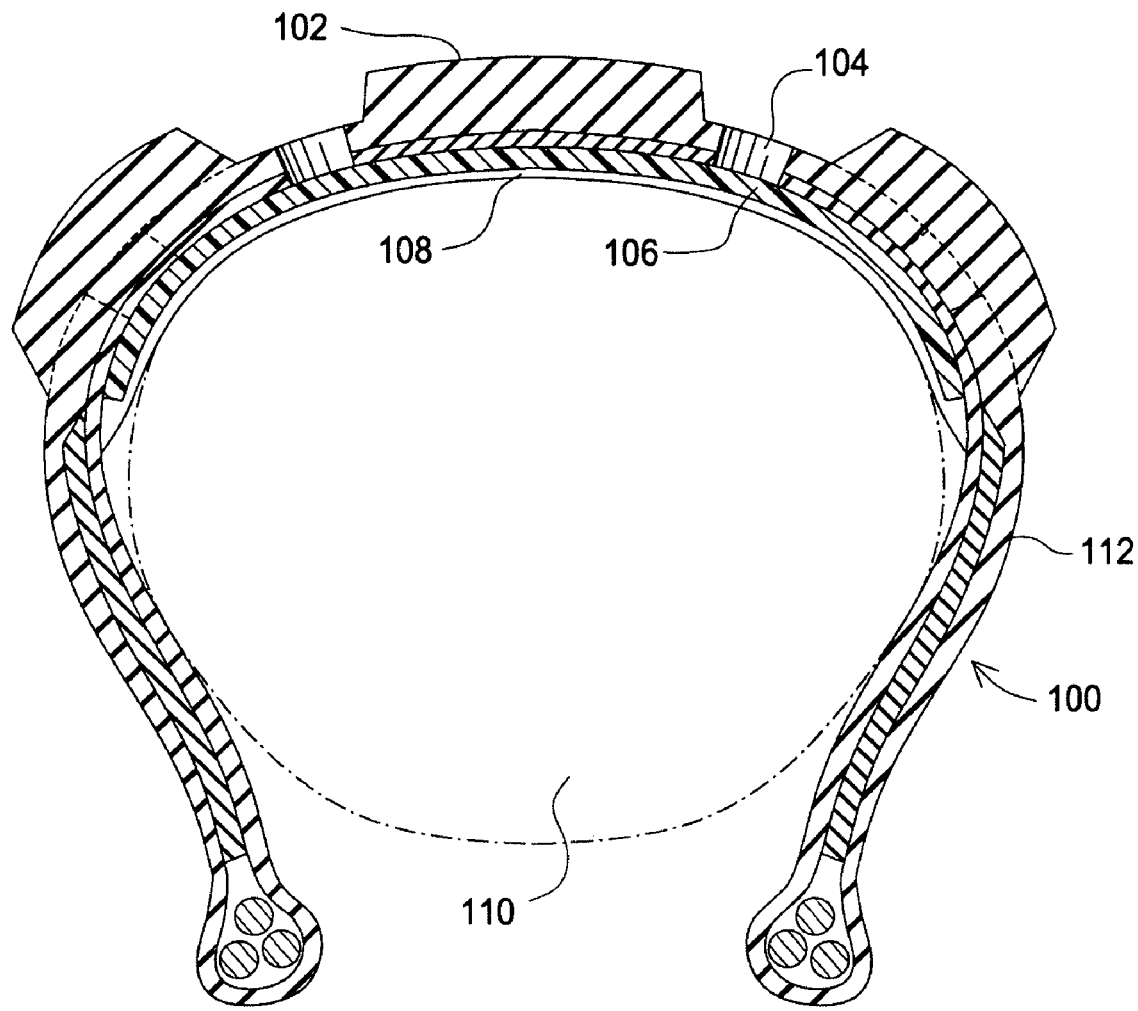
FIG. 3 is a cutaway view of the tire of FIGS. 1 and 2.

FIG. 3 is a cutaway view of the tire of FIGS. 1 and 2. FIG. 3 shows how tire 100 is structured. Tube 110 is generally not modified. Outer tire 112 is modified as follows. With outer tire 112 removed from tube 110, holes are formed in outer tire 112, preferably between raised areas of tread 102. The raised tread thus prevents the reflector material 106 from contacting the ground, and thus reduces wear. One hole per two square inches is adequate, and four holes per square inch works very well.

In one embodiment, reflective tape such as 3M "Conspicuity Tape" (for example brand name Scotchlite™ Diamond Grade™) is used for reflector material 106. In another embodiment, the reflective material comprises a laminated material such as Scotchlite™ reflective material, which comprises retroreflective lenses bonded to a polyester adhesive and laminated. The lamination has a further advantage of helping to prevent flat tires from thorns or the like. As an alternative, canvas type reflector tape may be used. Reflective tape is flat and flexible, and quite tough. Reflector material 106 is affixed to the inside of outer tire 112, for example with glue. A layer 108 of rubber or the like is applied over reflector material 106 as a protective layer. Layer 108 may be formed with spray on rubber.

Preferably, holes 104 are formed at least partially be melting tire 112. This seals the sides of the holes to prevent ripping an tearing. The tire may simply have holes melted in it, for example with a soldering iron, or hot drilling could drill out the holes, but seal the edges with heat at the same time. As an alternative, holes may be formed in the tire when it is manufactured.

Those skilled in the art will appreciate that various modifications to the exemplary embodiments are within the scope of the patent.

What is claimed is:

1. A reflective tire comprising:
   a tube;
   an outer treaded tire covering the tube, the outer tire forming holes between raised areas in the tread; and
   a flexible retro-reflective material sandwiched between the tube and the tread, the retro-reflective material showing through the holes in the tread.

2. The reflective tire of claim 1, wherein the retro-reflective material is laminated.

3. The reflective tire of claim 2, wherein the retro-reflective material comprises retroreflective lenses bonded to a polyester sheet.

4. The reflective tire of claim 1, wherein the retro-reflective material is bonded to the outer tire.

5. The reflective tire of claim 4, further comprising a resilient coating formed over the retro-reflective material facing the tube, for protecting the tube.

6. The reflective tire of claim 1, wherein the retro-reflective material forms a variety of angles with respect the plane of the wheel for reflecting light from a variety of directions.

7. The reflective tire of claim 1, wherein the retro-reflective material comprises more than one color.

8. A method for forming a reflective tire having a tube and a treaded outer tire comprising the steps of:
 a) forming holes in the outer tire; and
 b) inserting a flexible retro-reflective material between the tube and the outer tire, such that the reflective material is visible through the holes.

9. The method of claim 8, further including the step of:
 c) bonding the retro-reflective material to the outer tire.

10. The method of claim 9, further including the step of:
 d) forming a resilient coating over the retro-reflective material facing the tube.

11. The method of claim 8 wherein the step of forming holes comprises melting holes into the outer tire.

12. The method of claim 8 wherein the step of forming holes comprises forming the holes at the time the tire is fabricated.

13. The method of claim 8 wherein the step of forming holes comprises forming at least one hole per two square inches of outer tire tread surface.

14. The method of claim 8 wherein the step of forming holes comprises forming about four holes per square inch of outer tire tread surface.

* * * * *